US007949786B2

(12) United States Patent
Ha et al.

(10) Patent No.: US 7,949,786 B2
(45) Date of Patent: May 24, 2011

(54) METHOD OF ASSIGNING A NODE ADDRESS IN A LOCAL NETWORK

(75) Inventors: Sam-Chul Ha, Changwon-Shi (KR); Seung-Myun Baek, Changwon-Shi (KR); Koon-Seok Lee, Changwon-Shi (KR); Yong-Tae Kim, Gimhae-Shi (KR)

(73) Assignee: LG Electronics Inc., Seoul (KR)

( * ) Notice: Subject to any disclaimer, the term of this patent is extended or adjusted under 35 U.S.C. 154(b) by 1448 days.

(21) Appl. No.: 10/558,425

(22) PCT Filed: May 14, 2004

(86) PCT No.: PCT/KR2004/001151
§ 371 (c)(1), (2), (4) Date: Nov. 29, 2005

(87) PCT Pub. No.: WO2004/107092
PCT Pub. Date: Dec. 9, 2004

(65) Prior Publication Data
US 2006/0248158 A1  Nov. 2, 2006

(30) Foreign Application Priority Data

May 30, 2003  (KR) .................. 10-2003-0034962
Mar. 31, 2004  (KR) .................. 10-2004-0022191

(51) Int. Cl.
*G06F 15/16* (2006.01)

(52) U.S. Cl. ........ 709/245; 709/246; 709/238; 709/227; 709/220

(58) Field of Classification Search .................. 709/245, 709/246, 238, 227, 220
See application file for complete search history.

(56) References Cited

U.S. PATENT DOCUMENTS

| 4,888,728 A | 12/1989 | Shirakawa et al. |
| 4,928,245 A | 5/1990 | Moy et al. |
| 4,980,913 A | 12/1990 | Skret |

(Continued)

FOREIGN PATENT DOCUMENTS

CN  1199192  11/1998

(Continued)

OTHER PUBLICATIONS

Lee et al., "A New Control Protocol for Home Appliances—LnCP", Digital Appliance Company Research Lab, Digital Appliance Research Lab, LG Electronics, ISIE 2001, Pusan, Korea, p. 286-291. (downloaded Dec. 31, 2008 from IEEE Xplore).

(Continued)

*Primary Examiner* — Jeffrey Pwu
*Assistant Examiner* — Abdelnabi O Musa
(74) *Attorney, Agent, or Firm* — McKenna Long & Aldridge

(57) ABSTRACT

The present invention discloses a home network system using a living network control protocol. The home network system includes: at least one new device including a node address having an initial logical address through a network based on a predetermined protocol, transmitting a configuration request message having the node address to a master device, receiving a temporary address setting request message, changing the initial logical address by selecting one temporary logical address, generating a temporary address setting response message, transmitting the temporary address setting response message to the master device, receiving an address change request message having a predetermined logical address from the master device, changing the temporary logical address into the received logical address, and having a unique node address; and at least one master device for receiving the plurality of configuration request messages from the new device, setting the temporary logical address range for the new device, transmitting the temporary address setting request message having the set temporary logical address range to the new device, receiving the temporary address setting response message from the new device, setting the predetermined logical address of the new device, and transmitting the address change request message having the set logical address to the new device of the selected temporary address.

9 Claims, 10 Drawing Sheets

U.S. PATENT DOCUMENTS

| | | | |
|---|---|---|---|
| 5,268,666 A | 12/1993 | Michel et al. | |
| 5,519,858 A | 5/1996 | Walton et al. | |
| 5,551,001 A | 8/1996 | Cohen et al. | |
| 5,794,037 A | 8/1998 | Young | |
| 5,808,885 A | 9/1998 | Dew et al. | |
| 5,835,723 A | 11/1998 | Andrews et al. | |
| 5,859,847 A | 1/1999 | Dew et al. | |
| 5,867,666 A | 2/1999 | Harvey | |
| 6,006,272 A * | 12/1999 | Aravamudan et al. | 709/245 |
| 6,058,106 A | 5/2000 | Cudak et al. | |
| 6,078,952 A | 6/2000 | Fielding et al. | |
| 6,105,093 A | 8/2000 | Rosner et al. | |
| 6,160,808 A | 12/2000 | Maurya | |
| 6,233,248 B1 | 5/2001 | Sautter et al. | |
| 6,366,583 B2 | 4/2002 | Rowett et al. | |
| 6,415,313 B1 | 7/2002 | Yamada et al. | |
| 6,453,687 B2 | 9/2002 | Sharood et al. | |
| 6,507,953 B1 | 1/2003 | Horlander et al. | |
| 6,522,654 B1 | 2/2003 | Small | |
| 6,615,243 B1 | 9/2003 | Megeid et al. | |
| 6,618,764 B1 | 9/2003 | Shteyn | |
| 6,631,476 B1 | 10/2003 | Vandesteeg et al. | |
| 6,701,198 B1 | 3/2004 | Vandesteeg et al. | |
| 6,721,900 B1 | 4/2004 | Lenner et al. | |
| 6,731,201 B1 | 5/2004 | Bailey et al. | |
| 6,735,619 B1 | 5/2004 | Sawada | |
| 6,759,946 B2 | 7/2004 | Sahinoglu et al. | |
| 6,842,430 B1 | 1/2005 | Melnik | |
| 6,854,053 B2 | 2/2005 | Burkhardt et al. | |
| 6,856,999 B2 | 2/2005 | Flanagin et al. | |
| 6,891,850 B1 | 5/2005 | Vandesteeg et al. | |
| 6,915,444 B2 | 7/2005 | Vasko et al. | |
| 6,934,740 B1 | 8/2005 | Lawande et al. | |
| 6,982,960 B2 | 1/2006 | Lee et al. | |
| 6,987,462 B2 | 1/2006 | Bae et al. | |
| 7,028,312 B1 | 4/2006 | Merrick et al. | |
| 7,035,270 B2 | 4/2006 | Moore et al. | |
| 7,058,722 B2 | 6/2006 | Ikami et al. | |
| 7,062,531 B2 | 6/2006 | Kim | |
| 7,069,091 B2 | 6/2006 | Williamson | |
| 7,103,834 B1 | 9/2006 | Humpleman et al. | |
| 7,107,358 B2 | 9/2006 | Vasko et al. | |
| 7,111,100 B2 | 9/2006 | Ellerbrock | |
| 7,149,792 B1 | 12/2006 | Hansen et al. | |
| 7,200,683 B1 | 4/2007 | Wang et al. | |
| 7,257,104 B2 | 8/2007 | Shitama | |
| 7,287,062 B2 | 10/2007 | Im et al. | |
| 7,308,644 B2 | 12/2007 | Humpleman et al. | |
| 7,353,259 B1 | 4/2008 | Bakke et al. | |
| 7,389,332 B1 | 6/2008 | Muchow et al. | |
| 7,389,358 B1 | 6/2008 | Matthews et al. | |
| 7,403,994 B1 | 7/2008 | Vogl et al. | |
| 7,412,538 B1 | 8/2008 | Eytchison et al. | |
| 7,421,478 B1 | 9/2008 | Muchow | |
| 7,430,591 B2 | 9/2008 | Chamberlain | |
| 7,437,494 B2 | 10/2008 | Ellerbrock | |
| 7,454,517 B2 | 11/2008 | Ha et al. | |
| 7,461,164 B2 | 12/2008 | Edwards et al. | |
| 7,673,030 B2 * | 3/2010 | Hite et al. | 709/223 |
| 7,673,153 B1 * | 3/2010 | Oishi et al. | 713/193 |
| 2001/0025322 A1 | 9/2001 | Song et al. | |
| 2002/0011923 A1 | 1/2002 | Cunningham et al. | |
| 2002/0021465 A1 | 2/2002 | Moore et al. | |
| 2002/0026528 A1 | 2/2002 | Lo | |
| 2002/0035624 A1 | 3/2002 | Kim | |
| 2002/0038358 A1 | 3/2002 | Sweatt, III et al. | |
| 2002/0059617 A1 | 5/2002 | Terakado et al. | |
| 2002/0072356 A1 | 6/2002 | Yamashita et al. | |
| 2002/0103898 A1 | 8/2002 | Moyer et al. | |
| 2002/0118696 A1 | 8/2002 | Suda | |
| 2002/0120763 A1 | 8/2002 | Miloushev et al. | |
| 2002/0165989 A1 | 11/2002 | Etoh | |
| 2002/0193144 A1 | 12/2002 | Belski et al. | |
| 2003/0009537 A1 | 1/2003 | Wang | |
| 2003/0014630 A1 | 1/2003 | Spencer et al. | |
| 2003/0037166 A1 | 2/2003 | Ueno et al. | |
| 2003/0038730 A1 | 2/2003 | Imafuku et al. | |
| 2003/0051053 A1 | 3/2003 | Vasko et al. | |
| 2003/0051203 A1 | 3/2003 | Vasko et al. | |
| 2003/0053477 A1 | 3/2003 | Kim et al. | |
| 2003/0054809 A1 | 3/2003 | Bridges et al. | |
| 2003/0065824 A1 | 4/2003 | Kudo | |
| 2003/0067910 A1 | 4/2003 | Razazian et al. | |
| 2003/0079000 A1 | 4/2003 | Chamberlain | |
| 2003/0079001 A1 | 4/2003 | Chamberlain | |
| 2003/0083758 A1 | 5/2003 | Williamson | |
| 2003/0085795 A1 | 5/2003 | An | |
| 2003/0088703 A1 | 5/2003 | Kim | |
| 2003/0158956 A1 | 8/2003 | Tanaka et al. | |
| 2003/0165142 A1 | 9/2003 | Mills et al. | |
| 2004/0042487 A1 | 3/2004 | Ossman | |
| 2004/0047298 A1 | 3/2004 | Yook et al. | |
| 2004/0064578 A1 | 4/2004 | Boucher et al. | |
| 2004/0088731 A1 | 5/2004 | Putterman et al. | |
| 2004/0111490 A1 | 6/2004 | Im et al. | |
| 2004/0158333 A1 | 8/2004 | Ha et al. | |
| 2004/0184456 A1 | 9/2004 | Binding et al. | |
| 2004/0205309 A1 | 10/2004 | Watanabe | |
| 2005/0108568 A1 | 5/2005 | Bussiere et al. | |
| 2005/0190727 A1 | 9/2005 | Vanlieshout et al. | |
| 2006/0047677 A1 | 3/2006 | Lin et al. | |
| 2006/0248518 A1 | 11/2006 | Kundert | |
| 2006/0271709 A1 | 11/2006 | Vasko et al. | |
| 2007/0019615 A1 | 1/2007 | Baek et al. | |
| 2007/0025368 A1 | 2/2007 | Ha et al. | |
| 2008/0097631 A1 | 4/2008 | Baek et al. | |
| 2008/0222325 A1 | 9/2008 | Ishino et al. | |
| 2008/0255692 A1 | 10/2008 | Hofrichter et al. | |
| 2008/0259786 A1 | 10/2008 | Gonda | |

FOREIGN PATENT DOCUMENTS

| | | |
|---|---|---|
| CN | 1398469 | 2/2003 |
| EP | 1115263 A1 | 7/2001 |
| EP | 1 202 493 | 5/2002 |
| JP | 60-112336 | 6/1985 |
| JP | 61-216543 | 9/1986 |
| JP | 2002-325079 | 11/2002 |
| KR | 10-2001-0093265 | 10/2001 |
| KR | 10-2002-0064847 | 8/2002 |
| KR | 10-2003-0040766 | 5/2003 |
| WO | WO 0180030 | 10/2001 |
| WO | WO 02/097555 | 12/2002 |
| WO | WO 02/097555 A2 | 12/2002 |

OTHER PUBLICATIONS

Simon Baatz, et al., "Handoff Support for Mobility with IP over Bluetooth," Univ. of Bonn, Institute of Computer Science IV, (2000 IEEE), pp. 143-154.

Lee et al., "A New Home Network Protocol for Controlling and Monitoring Home Appliances—HNCP", IEEE, 2002, p. 312-313.

Wang et al., "Towards Dependable Home Networking: An Experience Report", IEEE, 2000, pp. 43-48.

Lee et al., "A New Control Protocol for Home Appliances", IEEE, 2001, pp. 286-291.

Hwang et al., "ATM-based plug-and-play technique for in-home networking", Electronics Letters, vol. 34, No. 22, pp. 2088-2090, 1998.

Manner et al., "Evaluation of Mobility and quality of service interaction", The International Journal of Computer and Telecommunications Networking, vol. 38, No. 2, pp. 137-163, 2002.

Ganz et al., "Q-Soft: software framework for QoS support in home networks", Computer Networks, vol. 42, No. 1, pp. 7-22, 2003.

"Introduction and Technology Trend of Home Network," Samsung SDS IT Review, Jan. 2002 (Korean language with English translation).

Koon-Seok Lee, et al., "Network Configuration Technique for Home Appliances based on LnCP," 2003 IEEE, pp. 367-374.

Seungcheon Kim et al., "Home Networking Digital TV Based on LnCP," IEEE Transactions on Consumer Electronics, vol. 48, No. 4, Nov. 2002, pp. 990-996.

Koon-Seok Lee et al., "Network Configuration Technique for Home Appliances," Consumer Electronics, 2002, ICCE, 2002 Digest of Technical Papers, International Conference, 10.1109/ICCE.2002. 1013981, May 2002, pp. 180-181.

S, Kent et al., "Security Architecture for the Internet Protocol," Request for Comments (RFC) 2401, The Internet Society, Nov. 1988.

* cited by examiner

| FIXED CODE (8 BITS) | LOGICAL ADDRESS (8 BITS) |
|---|---|
| PRODUCT CODE | DEVICE CODE |
| | CLUSTER CODE |

| PRODUCT CODE | PRODUCT CODE | ADDRESS RANGE |
|---|---|---|
| NETWORK MANAGER | 0x00 | 0x0001~0x00FD |
| REFRIGERATOR | 0x01 | 0x0101~0x01FD |
| AIR CONDITIONER | 0x02 | 0x0201~0x02FD |
| MICROWAVE OVEN | 0x03 | 0x0301~0x03FD |
| ⋮ | ⋮ | ⋮ |

FIG.8A

| RECEIVER | SENDER | COMMAND CODE | ARGUMENT |
|---|---|---|---|
| 0x00FF | 0x0200 | 0x1A | |

FIG.8B

| RECEIVER | SENDER | COMMAND CODE | ARGUMENT |
|---|---|---|---|
| 0x0200 | 0x0001 | 0x0F | 0x01 |

FIG.8C

| RECEIVER | SENDER | COMMAND CODE | ACK | ARGUMENT |
|---|---|---|---|---|
| 0x0001 | 0x0200 | 0x0F | 0x06 | |

FIG.8D

| RECEIVER | SENDER | COMMAND CODE | ARGUMENT | |
|---|---|---|---|---|
| 0x0200 | 0x0001 | 0x0E | 0x0F | 0xFD |

FIG.8E

| RECEIVER | SENDER | COMMAND CODE | ARGUMENT |
|---|---|---|---|
| 0x02FF | 0x0200 | 0xFF81 | 0x10 |

FIG.8F

| RECEIVER | SENDER | COMMAND CODE | ACK | ARGUMENT |
|---|---|---|---|---|
| 0x0001 | 0x0210 | 0x0E | 0x06 | 0x10 |

METHOD OF ASSIGNING A NODE ADDRESS IN A LOCAL NETWORK

This application claims the benefit of Korean Patent Application No. 2003-0034962, filed on May 30, 2003; Korean Patent Application No. 2004-0022191, filed Mar. 31, 2004; and PCT Application No. PCT/KR2004/001151, filed May 14, 2004, which are hereby incorporated by reference for all purposes as if fully set forth herein.

TECHNICAL FIELD

The present invention relates to a home network system, and more particularly to, a home network system using a living network control protocol.

BACKGROUND ART

A home network connects various digital home appliances so that the user can always enjoy convenient, safe and economic life services inside or outside the house. Refrigerators or washing machines called white home appliances have been gradually digitalized due to the development of digital signal processing techniques, home appliance operating system techniques and high speed multimedia communication techniques have been integrated on the digital home appliances, and new information home appliances have been developed, to improve the home network.

As shown in Table 1, the home network is classified into a data network, an entertainment network and a living network by types of services.

TABLE 1

| Classification | Function | Service type |
|---|---|---|
| Data network | Network between PC and peripheral devices | Data exchange, internet service, etc. |
| Entertainment network | Network between A/V devices | Music, animation service, etc. |
| Living network | Network for controlling home appliances | Home appliances control, home automation, remote meter reading, message service, etc. |

Here, the data network is built to exchange data between a PC and peripheral devices or provide an internet service, and the entertainment network is built between home appliances using audio or video information. In addition, the living network is built to simply control home appliances, such as home automation or remote meter reading.

A conventional home network system includes a master device which is an electric device for controlling an operation of the other electric devices or monitoring a status thereof, and a slave device which is an electric device having a function of responding to the request of the master device and a function of notifying a status change according to characteristics of the electric devices or other factors. Exemplary electric devices include home appliances for the living network service such as a washing machine and a refrigerator, home appliances for the data network service and the entertainment network service, and products such as a gas valve control device, an automatic door device and an electric lamp.

However, the conventional arts do not suggest a general communication standard for providing functions of controlling and monitoring electric devices in a home network system.

DISCLOSURE OF THE INVENTION

The present invention is achieved to solve the above problems. An object of the present invention is to provide a home network system using a control protocol which is a general communication standard for providing functions of controlling and monitoring electric devices in the home network system.

Another object of the present invention is to provide a home network system using a living network control protocol as a general communication standard.

Yet another object of the present invention is to provide a home network system which can designate and register a unique node address in a new device.

Yet another object of the present invention is to provide a home network system which can designate and register a unique node address in a plurality of same kind new devices.

Yet another object of the present invention is to provide a home network system which can prevent efficiency from being reduced due to duplicate logical addresses by enabling new devices to confirm each other's logical addresses.

Yet another object of the present invention is to provide a home network system which can make a new device as a component simply by power supply and network access.

In order to achieve the above-described objects of the invention, there is provided a home network system including: at least one new device including a node address having an initial logical address when accessing the home network system through a network based on a predetermined protocol, transmitting a configuration request message having the node address to a master device through the network, receiving a temporary address setting request message having a predetermined temporary logical address range, changing the initial logical address by selecting one temporary logical address, generating a temporary address setting response message having the selected temporary logical address, transmitting the temporary address setting response message to the master device, receiving an address change request message having a predetermined logical address from the master device, changing the temporary logical address into the received logical address, and having a unique node address; and at least one master device connected to the new device through the network, for receiving the plurality of configuration request messages from the new device, setting the temporary logical address range for the new device, transmitting the temporary address setting request message having the set temporary logical address range to the new device, receiving the temporary address setting response message from the new device, setting the predetermined logical address of the new device, and transmitting the address change request message having the set logical address to the new device of the selected temporary address.

Preferably, the master device updates a home net profile by registering the node address having the set logical address of the new device.

Preferably, the master device transmits an added device notification message having the node address of the new device to another master device.

Preferably, the new device transmits an address change ACK response message to the master device.

Preferably, the node address includes at least a product code and the initial logical address of the new device.

Preferably, the new device receives a temporary address allocation notification message having a temporary logical address set by another new device from another new device after changing the logical address into the temporary logical address.

Preferably, the new device performs reception for a random time within a first predetermined time after changing the logical address into the temporary logical address.

Preferably, the new device and another new device are of the same kind.

Preferably, the new device compares the received temporary logical address with the temporary logical address set by the new device, and when the two temporary logical addresses are identical, the new device changes the set temporary logical address into a predetermined restricted logical address.

Preferably, the restricted logical address is 0xFE.

Preferably, the new device generates a temporary address setting response message having the restricted logical address and transmits the message to the master device after setting the preset temporary logical address as the predetermined restricted logical address.

Preferably, the master device decides whether the temporary logical address included in the received temporary address change response message is the restricted logical address, generates an address change request message for changing the temporary logical address into the initial logical address according to the decision result, and transmits the message to the new device transmitting the temporary address change response message.

Preferably, when the new device receives the address change request message for changing the logical address into the initial logical address, the new device changes the restricted logical address into the initial logical address.

Preferably, the new device generates a temporary address allocation notification message having the temporary logical address and transmits the message to another new device after changing the logical address into the temporary logical address.

Preferably, the new device maintains a standby state for a random time within a second predetermined time after transmitting the temporary address allocation notification message.

Preferably, the new device stops transmitting the temporary address allocation notification message after changing the set temporary logical address into a predetermined restricted logical address.

Preferably, when the master device sets the temporary logical address range, the master device decides whether it has received the configuration request messages from the same kind products, when the master device has received the configuration request messages from the same kind devices, the master device sets the same temporary logical address range for the new devices, and when the master device has received the configuration request messages from different kind devices, the master device sets the temporary logical address ranges for each of the identical new devices.

Preferably, the master device sets logical addresses of the different kind new devices after setting logical addresses of the new devices having the same temporary logical address range.

Preferably, the address change request message includes the temporary logical address and the set logical address.

Preferably, the temporary logical address range is individually set according to the product code.

Preferably, the temporary logical address range does not duplicate with the preset logical address.

Preferably, the temporary logical address range is included between a value of the preset logical address and a value of the restricted logical address.

Preferably, at least one non-set logical address is included between the lowest limit value of the temporary logical address range and the value of the preset logical address.

Preferably, the protocol is a living network control protocol (LnCP).

According to one aspect of the present invention, an electric device includes: an interface means accessing through a network based on a predetermined protocol; a storage means for storing a home net profile having node addresses of devices connected to the network, and a predetermined logical address; and a control means connected to a new device through the interface means, for receiving a plurality of configuration request messages including a node address having an initial logical address from the new device, setting a temporary logical address range for the new device by reading the logical address from the storage means, transmitting a temporary address setting request message having the set temporary logical address range to the new device, receiving a temporary address setting response message from the new device, setting a logical address of the new device by reading the logical address from the storage means, and transmitting an address change request message having the set logical address to the new device of the selected temporary address.

According to another aspect of the present invention, an electric device includes: an interface means communicating with a home network system through a network based on a predetermined protocol; a storage means for storing a logical address having at least a product code and an initial logical address; and when the interface means accesses the home network system, a control means for transmitting a configuration request message having the node address to the home network system, receiving a temporary address setting request message having a predetermined temporary logical address range, changing the initial logical address by selecting one temporary logical address, generating a temporary address setting response message having the selected temporary logical address, transmitting the temporary address setting response message to the home network system, receiving an address change request message having a predetermined logical address from the home network system, changing the temporary logical address into the received logical address, and storing a unique node address in the storage means.

BRIEF DESCRIPTION OF THE DRAWINGS

FIGS. 8A to 8F are schematic structure views illustrating messages used in the home network system in accordance with the present invention.

BEST MODE FOR CARRYING OUT THE INVENTION

A home network system in accordance with the present invention will now be described in detail with reference to the accompanying drawings.

Figure 1:
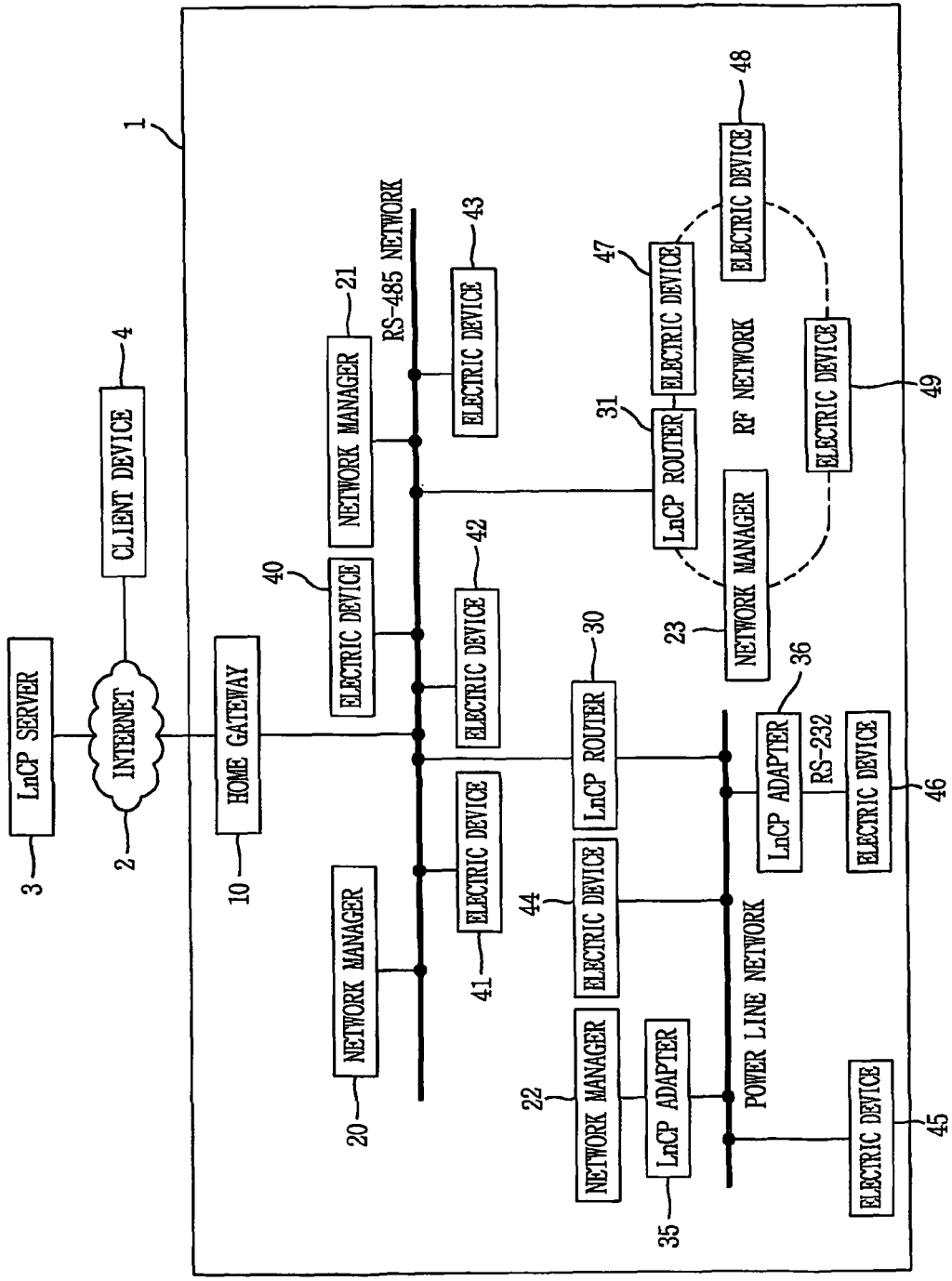
FIG. 1 is a structure view illustrating a home network system in accordance with the present invention.

FIG. 1 is a structure view illustrating the home network system in accordance with the present invention.

Referring to FIG. 1, the home network system 1 accesses an LnCP server 3 through an internet 2, and a client device 4 accesses the LnCP server 3 through the internet 2. That is, the home network system 1 is connected to communicate with the LnCP server 3 and/or the client device 4.

An external network of the home network system 1 such as the internet 2 includes additional constitutional elements according to a kind of the client device 4. For example, when the client device 4 is a computer, the internet 2 includes a Web server (not shown), and when the client device 4 is an internet phone, the internet 2 includes a Wap server (not shown).

The LnCP server 3 accesses the home network system 1 and the client device 4 according to predetermined login and logout procedures, respectively, receives monitoring and control commands from the client device 4, and transmits the commands to the network system 1 through the internet 2 in the form of predetermined types of messages. In addition, the LnCP server 3 receives a predetermined type of message from the home network system 1, and stores the message and/or transmits the message to the client device 4. The LnCP server 3 also stores or generates a message, and transmits the message to the home network system 1. That is, the home network system 1 accesses the LnCP server 3 and downloads provided contents.

The home network system 1 includes a home gateway 10 for performing an access function to the internet 2, network managers 20 to 23 for performing a function of setting an environment and managing electric devices 40 to 49, LnCP routers 30 and 31 for access between transmission media, LnCP adapters 35 and 36 for connecting the network manager 22 and the electric device 46 to the transmission medium, and the plurality of electric devices 40 to 49.

The network of the home network system 1 is formed by connecting the electric devices 40 to 49 through a shared transmission medium. A data link layer uses a non-standardized transmission medium such as RS-485 or small output RF, or a standardized transmission medium such as a power line and IEEE 802.11 as the transmission medium.

The network of the home network system 1 is separated from the internet 2, for composing an independent network for connecting the electric devices through wire or wireless transmission medium. Here, the independent network includes a physically-connected but logically-divided network.

The home network system 1 includes master devices for controlling operations of the other electric devices 40 to 49 or monitoring statuses thereof, and slave devices having functions of responding to the request of the master devices and notifying their status change information. The master devices include the network managers 20 to 23, and the slave devices include the electric devices 40 to 49. The network managers 20 to 23 include information of the controlled electric devices 40 to 49 and control codes, and control the electric devices 40 to 49 according to a programmed method or by receiving inputs from the LnCP server 3 and/or the client device 4. Still referring to FIG. 1, when the plurality of network managers 20 to 23 are connected, each of the network managers 20 to 23 must be both the master device and the slave device, namely physically one device but logically the device (hybrid device) for simultaneously performing master and slave functions in order to perform information exchange, data synchronization and control with the other network managers 20 to 23.

In addition, the network managers 20 to 23 and the electric devices 40 to 49 can be connected directly to the network (power line network, RS-485 network and RF network) or through the LnCP routers 30 and 31 and/or the LnCP adapters 35 and 36.

The electric devices 40 to 49 and/or the LnCP routers 30 and 31 and/or the LnCP adapters 35 and 36 are registered in the network managers 20 to 23, and provided with intrinsic logical addresses by products (for example, 0x00, 0x01, etc.). The logical addresses are combined with product codes (for example, 0x02 of air conditioner and 0x01 of washing machine), and used as node addresses. For example, the electric devices 40 to 49 and/or the LnCP routers 30 and 31 and/or the LnCP adapters 35 and 36 are identified by the node addresses such as 0x0200 (air conditioner 1) and 0x0201 (air conditioner 2). A group address for identifying at least one electric device 40 to 49 and/or at least one LnCP router 30 and 31 and/or at least one LnCP adapter 35 and 36 at a time can be used according to a predetermined standard (all identical products, installation space of products, user, etc.). In the group address, an explicit group address is a cluster for designating a plurality of devices by setting an address option value (flag mentioned below) as 1, and an implicit group address designates a plurality of devices by filling the whole bit values of the logical addresses and/or the product codes with 1. Especially, the implicit group address is called a cluster code.

Figure 2:
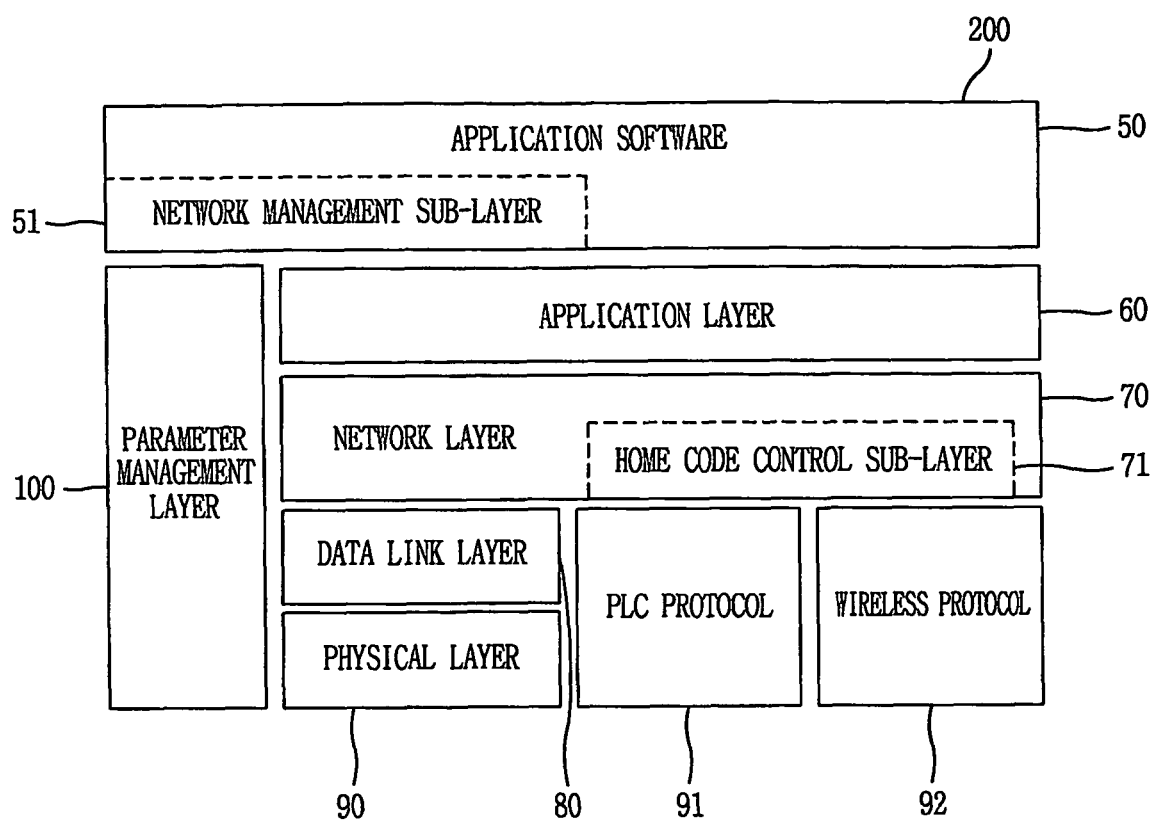
FIG. 2 is a structure view illustrating a living network control protocol stack in accordance with the present invention.

FIG. 2 is a structure view illustrating a living network control protocol stack in accordance with the present invention. The home network system 1 enables the network managers 20 to 23, the LnCP routers 30 and 31, the LnCP adapters 35 and 36 and the electric devices 40 to 49 to communicate with each other according to the living network control protocol (LnCP) of FIG. 2. Therefore, the network managers 20 to 23, the LnCP routers 30 and 31, the LnCP adapters 35 and 36 and the electric devices 40 to 49 perform network communication according to the LnCP.

As illustrated in FIG. 2, the LnCP includes an application software 50 for performing intrinsic functions of the network managers 20 to 23, the LnCP routers 30 and 31, the LnCP adapters 35 and 36 and the electric devices 40 to 49, and providing an interface function with an application layer 60 for remote controlling and monitoring on the network, the application layer 60 for providing services to the user, and also providing a function of forming information or a command from the user in the form of a message and transmitting the message to the lower layer, a network layer 70 for reliably network-connecting the network managers 20 to 23, the LnCP routers 30 and 31, the LnCP adapters 35 and 36 and the electric devices 40 to 49, a data link layer 80 for providing a medium access control function of accessing a shared transmission medium, a physical layer 90 for providing physical interfaces between the network managers 20 to 23, the LnCP routers 30 and 31, the LnCP adapters 35 and 36 and the electric devices 40 to 49, and rules for transmitted bits, and a parameter management layer 100 for setting and managing node parameters used in each layer.

In detail, the application software 50 further includes a network management sub-layer 51 for managing the node parameters, and the network managers 20 to 23, the LnCP routers 30 and 31, the LnCP adapters 35 and 36 and the electric devices 40 to 49 which access the network. That is, the network management sub-layer 51 performs a parameter management function of setting or using the node parameter values through the parameter management layer 100, and a network management function of composing or managing the network when the device using the LnCP is a master device.

When the network which the network managers 20 to 23, the LnCP routers 30 and 31, the LnCP adapters 35 and 36 and the electric devices 40 to 49 access is a dependent transmission medium such as a power line, IEEE 802.11 and wireless (for example, when the LnCP includes a PLC protocol and/or wireless protocol), the network layer 70 further includes a home code control sub-layer 71 for performing a function of setting, managing and processing home codes for logically dividing each individual network. When the individual networks are physically divided by an independent transmission medium such as RS-485, the home code control sub-layer 71 is not included in the LnCP. Each of the home codes is comprised of 4 bytes, and set as random values or designated values of the user.

Figure 3A:
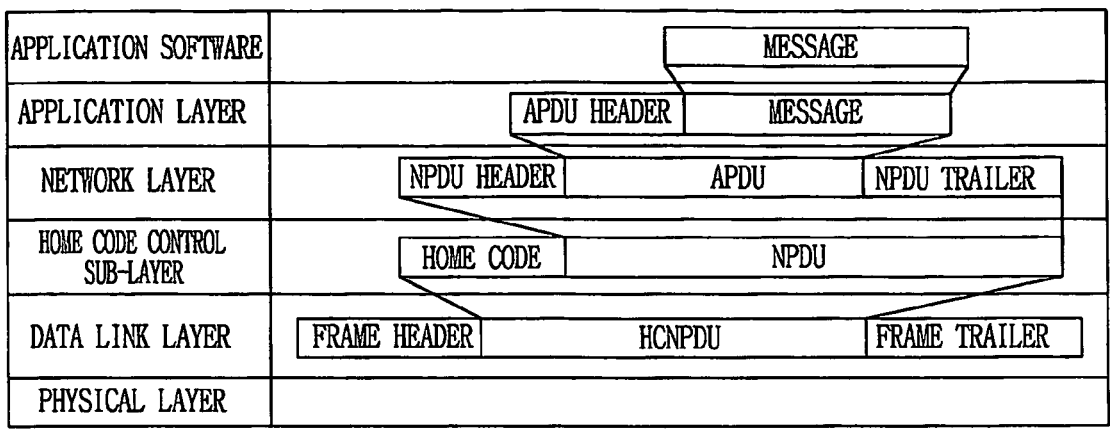
FIGS. 3A and 3B are structure views illustrating interfaces between layers of FIG. 2, respectively.
Figure 3B:
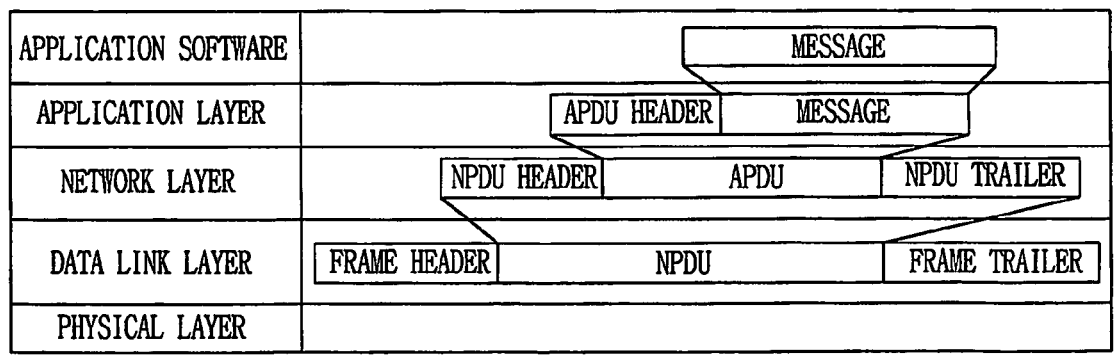

FIGS. 3A and 3B are structure views illustrating interfaces between the layers of FIG. 2, respectively.

FIG. 3A illustrates the interfaces between the layers when the physical layer 90 is connected to the dependent transmission medium, and FIG. 3B illustrates the interfaces between the layers when the physical layer 90 is connected to the independent transmission medium.

The home network system 1 adds headers and trailers required by each layer to protocol data units (PDU) from the upper layers, and transmit them to the lower layers.

As shown in FIGS. 3A and 3B, an application layer PDU (APDU) is a data transmitted between the application layer 60 and the network layer 70, a network layer PDU (NPDU) is a data transmitted between the network layer 70 and the data link layer 80 or the home code control sub-layer 71, and a home code control sub-layer PDU (HCNPDU) is a data transmitted between the network layer 70 (precisely, the home code control sub-layer 71) and the data link layer 80. The interface is formed in data frame units between the data link layer 80 and the physical layer 90.

FIGS. 4A to 4F are detailed structure views illustrating the interfaces of FIGS. 3A and 3B, respectively.

Figure 4A:
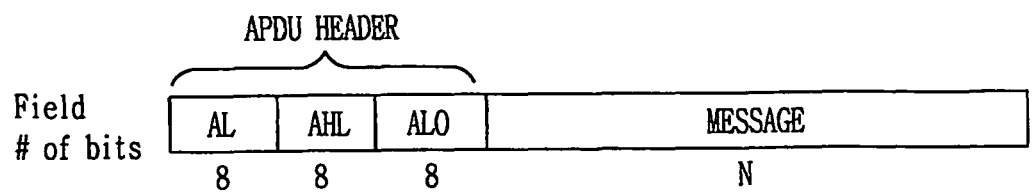
FIGS. 4A to 4F are detailed structure views illustrating the interfaces of FIGS. 3A and 3B, respectively.

FIG. 4A illustrates the APDU structure in the application layer 60.

An APDU length (AL) field shows a length of the APDU (length from AL to message field), and has a minimum value of 4 and a maximum value of 77.

An APDU header length (AHL) field shows a length of an APDU header (length from AL to AL0), normally has 3 bytes, and is extensible to 7 bytes. In the LnCP, the APDU header can be extended to 7 bytes to encode a message field and change an application protocol.

An application layer option (ALO) field extends a message set. For example, when the ALO field is set as 0, if the ALO field contains a different value, message processing is ignored.

The message field processes a control message from the user or event information, and is changed by the value of the ALO field.

Figure 4B:
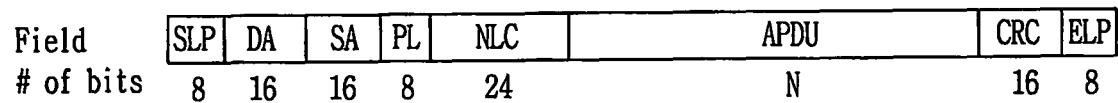
Figure 4C:
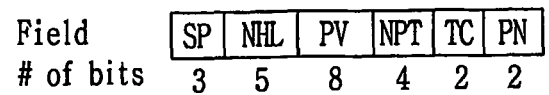

FIG. 4B illustrates the NPDU structure in the network layer 70, and FIG. 4C illustrates a detailed NLC structure of the NPDU.

A start of LnCP packet (SLP) field shows start of a packet and has a value of 0x02.

Destination address (DA) and source address (SA) fields are node addresses of a receiver and a sender of a packet, and have 16 bits, respectively. The most significant 1 bit includes a flag indicating a group address, the succeeding 7 bits include a kind of a product (product code), and the lower 8 bits include a logical address for distinguishing the plurality of network managers 20 to 23 of the same kind and the plurality of electric devices 40 to 49 of the same kind.

A packet length (PL) field shows the whole length of the NPDU, and has a minimum value of 12 bytes and a maximum value of 100 bytes.

A service priority (SP) field gives transmission priority to a transmission message and has 3 bits. Table 2 shows the priority of each transmission message.

When a slave device responds to a request of a master device, the slave device takes the priority of the request message from the master device.

TABLE 2

| Priority | Value | Application layer |
|----------|-------|-------------------|
| High | 0 | When an urgent message is transmitted |
| Middle | 1 | When a normal packet is transmitted |
| | | When an event message for online or offline status change is transmitted |
| Normal | 2 | When a notification message for composing a network is transmitted |
| | | When a normal event message is transmitted |
| Low | 3 | When a data is transmitted by download or upload mechanism |

An NPDU header length (NHL) field extends an NPDU header (NLC field of SLP), normally has 9 bytes, and is extensible maximally to 16 bytes.

A protocol version (PV) field is an one-byte field showing a version of a used protocol. The upper 4 bits include a version field and the lower 4 bits include a sub-version field. The version and the sub-version are represented by the hexadecimal, respectively.

A network layer packet type (NPT) field is a 4-bit field for distinguishing a kind of a packet in the network layer 70. The LnCP includes a request packet, a response packet and a notification packet. The NPT field of a master device must be set as the request packet or the notification packet, and the NPT field of a slave device must be set as the response packet or the notification packet. Table 3 shows NPT values by kinds of packets.

TABLE 3

| Explanation | Value |
|-------------|-------|
| Request packet | 0 |
| Not used | 1~3 |
| Response packet | 4 |
| Not used | 5~7 |
| Notification packet | 8 |
| Not used | 9~12 |
| Reserved value for interface with the home code control sub-layer | 13~15 |

A transmission counter (TC) field is a 2-bit field for retrying a request packet when the request packet or response packet is not successfully transmitted due to a communication error in the network layer 70, or repeatedly transmitting a notification packet to improve a transmission success ratio. A receiver can check a duplicate message by using a value of the TC field. Table 4 shows the range of the values of the TC field by the NPT values.

TABLE 4

| Kind of packet | Value (range) |
|----------------|---------------|
| Request packet | 1~3 |
| Response packet | 1 |
| Notification packet | 1~3 |

A packet number (PN) field has 2 bits, and is used to check a duplicate packet in a slave device with the TC field and process a plurality of communication cycles in a master device. Table 5 shows the range of the values of the PN field by the NPT values.

TABLE 5

| Kind of packet | Value (range) |
| --- | --- |
| Request packet | 0~3 |
| Response packet | Copy a PN field value of a request packet |
| Notification packet | 0~3 |

An APDU field is a protocol data unit of the application layer 60 transmitted between the application layer 60 and the network layer 70. The APDU field has a minimum value of 0 byte and a maximum value of 88 bytes.

A cyclic redundancy check (CRC) field is a 16-bit field for checking an error of a received packet (from SLP to APDU).

An end of LnCP packet (ELP) field shows end of a packet and has a value of 0x03. Although a data corresponding to the length of the PL field is received, if the ELP field is not checked, it is deemed to be a packet error.

Figure 4D:
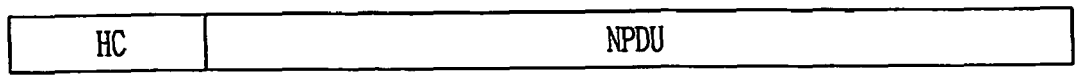

FIG. 4D illustrates the HCNPDU structure in the home code control sub-layer 71.

As depicted in FIG. 4D, a home code (HC) field is added to the upper portion of the NPDU.

The home code is comprised of 4 bytes, and has a unique value within the line distance where a packet can be transmitted.

Figure 4E:
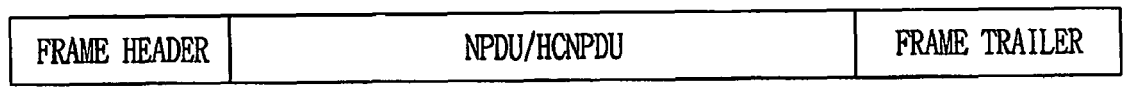

FIG. 4E illustrates a frame structure in the data link layer 80.

The structure of the header and the trailer of the data link layer frame of the LnCP is changed according to transmission media. When the data link layer 80 uses a non-standardized transmission medium, the header and the trailer of the frame must have null fields, and when the data link layer 80 uses a standardized transmission medium, the header and the trailer of the frame are formed as prescribed by the protocol. An NPDU field is a data unit transmitted from the upper network layer 70, and an HCNPDU field is a data unit obtained by adding 4 bytes of home code to the front portion of the NPDU, when the physical layer 90 is a dependent transmission medium such as a power line or IEEE 802.11. The data link layer 80 processes the NPDU and the HCNPDU in the same manner.

Figure 4F:
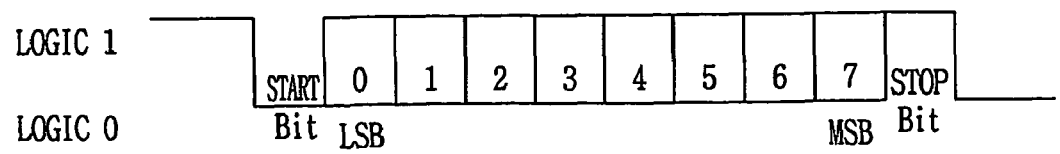

FIG. 4F illustrates a frame structure in the physical layer 90.

The physical layer 90 of the LnCP handles a function of transmitting and receiving a physical signal to a transmission medium. The data link layer 80 can use a non-standardized transmission medium such as RS-485 or small output RF or a standardized transmission medium such as a power line or IEEE. 802.11 as the physical layer 90 of the LnCP. The home network system 1 using the LnCP employs a universal asynchronous receiver and transmitter (UART) frame structure and a signal level of RS-232, so that the network managers 20 to 23 and the electric devices 40 to 49 can interface with RS-485, the LnCP routers 30 and 31 or the LnCP adapters 35 and 36. When the UART is connected between the devices by using a serial bus, the UART controls flow of bit signals on a communication line. In the LnCP, a packet from the upper layer is converted into 10 bits of UART frame unit as shown in FIG. 4f, and transmitted through the transmission medium. The UART frame includes one bit of start bit, 8 bits of data and one bit of stop bit, and does not use a parity bit. The UART frame is transmitted in the order of the start bit to stop bit.

When the home network system 1 using the LnCP employs the UART, it does not have additional frame header and frame trailer.

Figures 5A, 5B, 5C:
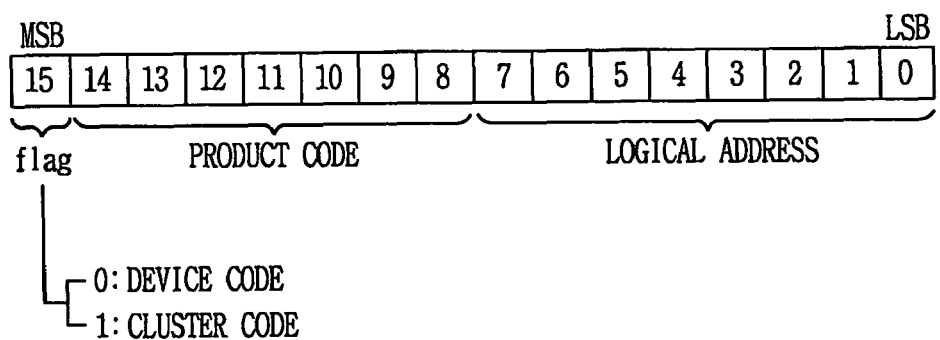
FIGS. 5A to 5C are structure views illustrating an address system used in the home network system in accordance with the present invention.

FIGS. 5A to 5C are structure views illustrating an address system used in the home network system in accordance with the present invention.

FIG. 5A is a structure view illustrating an address field used in the home network system 1 in accordance with the present invention. Referring to FIG. 5A, a product code is allocated as a unique value for identifying a basic function of a product. The product code is a physical address which is allocated to the product in shipment and which is not changeable. The same kind products are provided with the same fixed address. A device code is a logical address for identifying devices having the same product code. A cluster code is a logical address allocated to at least one product under a predetermined standard.

FIG. 5B is a detailed structure view illustrating the address field of FIG. 5A. As illustrated in FIG. 5B, an MSB of the fixed address field is used as a flag. Here, 0 denotes a device code and 1 denotes a cluster code. The logical addresses for the device code and the cluster code can be identified by differently setting the MSB values in the whole address fields. When the whole bits of each sub-field are set to be 1, it implies a group address. For example, when a product code of a refrigerator is 0x01, 0x01FF implies a group address of refrigerators, and 0x81XX (X is an unspecific number) implies a group address of all refrigerators having the same cluster code.

The device code is automatically set in every slave device by the master device. The cluster code can be automatically set by the master device, and also can be set by the user in consideration of technical problems.

For example, the electric devices 40 to 49 and/or the LnCP routers 30 and 31 and/or the LnCP adapters 35 and 36 are identified by node addresses such as 0x0200 (air conditioner 1) and 0x0201 (air conditioner 2). A group address for identifying at least one electric device 40 to 49 and/or at least one LnCP router 30 and 31 and/or at least one LnCP adapter 35 and 36 at a time can be used according to a predetermined standard (all identical products, installation space of products, user, etc.). In the group address, an explicit group address is a cluster for designating a plurality of devices by setting an address option value (flag mentioned below) as 1, and an implicit group address designates a plurality of devices by filling the whole bit values of the logical address and/or the product code with 1. Especially, the explicit group address is called a cluster code.

For example, the device having the product code of 0bXXX XXXX, the logical address of 0bYYYY YYYY and the cluster code of 0bZZZZ ZZZZ is recognized by eight kinds of addresses.

(1) Address designation of the whole devices is performed by 0b1111 1111 1111 1111 or 0b0111 1111 1111 1111 (0xFFFF or 0x7FFF);

(2) Address designation by the product code is performed by 0b1XXX XXXX 1111 1111 or 0b0XXX XXXX 111 1111;

(3) Address designation by the cluster code is performed by 0b1111 1111 ZZZZ ZZZZ;

(4) Address designation by the logical address is performed by 0b0111 1111 YYYY YYYY;

(5) Address designation by the product code and the logical address is performed by 0b0XXX XXXX YYYY YYYY; and (6) Address designation by the product code and the cluster code is performed by 0b1XXX XXXX ZZZZ ZZZZ.

FIG. 5C is a table showing examples of product codes and address ranges in each product. In the address ranges, 0xXX00 denotes initial logical addresses of each product, 0xXXFF denotes group addresses of each product, 0xXXFE denotes restricted logical addresses (discussed later), and 0xXX01 to 0xXXFD denote logical addresses which can be allocated to the master device and the slave device.

The node addresses including the product codes and the initial logical addresses are stored in storage means of the master device and the slave device in product shipment.

Figure 6:
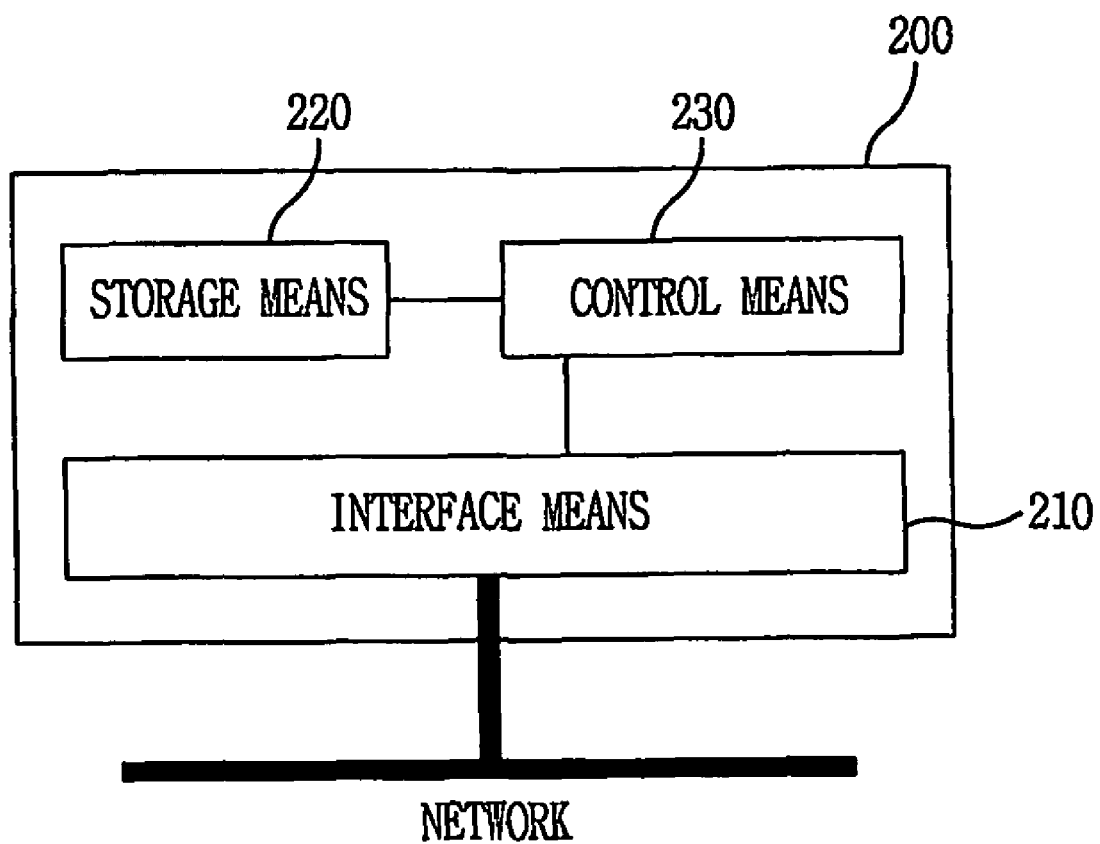
FIG. 6 is a schematic structure view illustrating a common structure of a network manager and an electric device.

FIG. 6 is a schematic structure view illustrating a common structure of the network manager and the electric device.

As depicted in FIG. 6, each of the network managers 20 to 23 (hereinafter, referred to as 'master devices') and the electric devices 40 to 49 (hereinafter, referred to as 'slave devices') includes an interface means 210 for access to the network, a predetermined storage means 220, and a control means 230 for setting a unique node address of at least a new device (new electric device or new network manager) by controlling the interface means 210 and the storage means 220.

In detail, the storage means 220 of the master device stores product information and product address information of the other master devices and slave devices. A home net profile includes the information (product information, set or non-set node address information, etc.) of the whole products connected to the network. The home net profile is stored in the storage means 220, and read, updated and registered by the control means 230.

The storage means 220 of the slave device stores at least its product code and initial logical address. The storage means 220 additionally stores a temporary logical address and a logical address set by the master device.

Hereinafter, predetermined operations are performed by the control means 230 of the master device or the slave device. For convenience' sake, it is described that such operations are performed by the master device or the slave device.

Figure 7A:
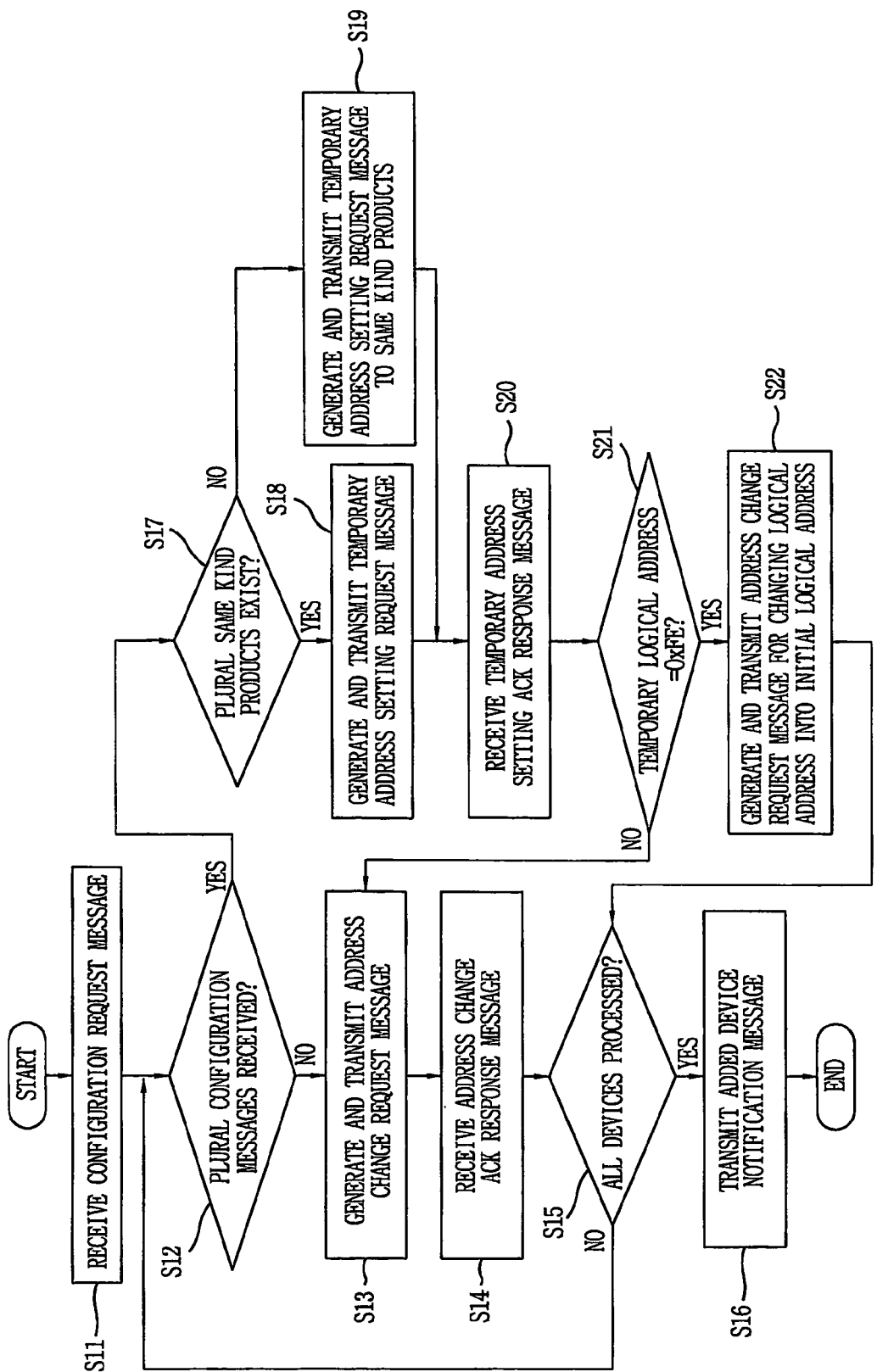
FIGS. 7A and 7B are flowcharts showing sequential steps of a process for setting a node address of a new device in the home network system in accordance with the present invention.
Figure 7B:
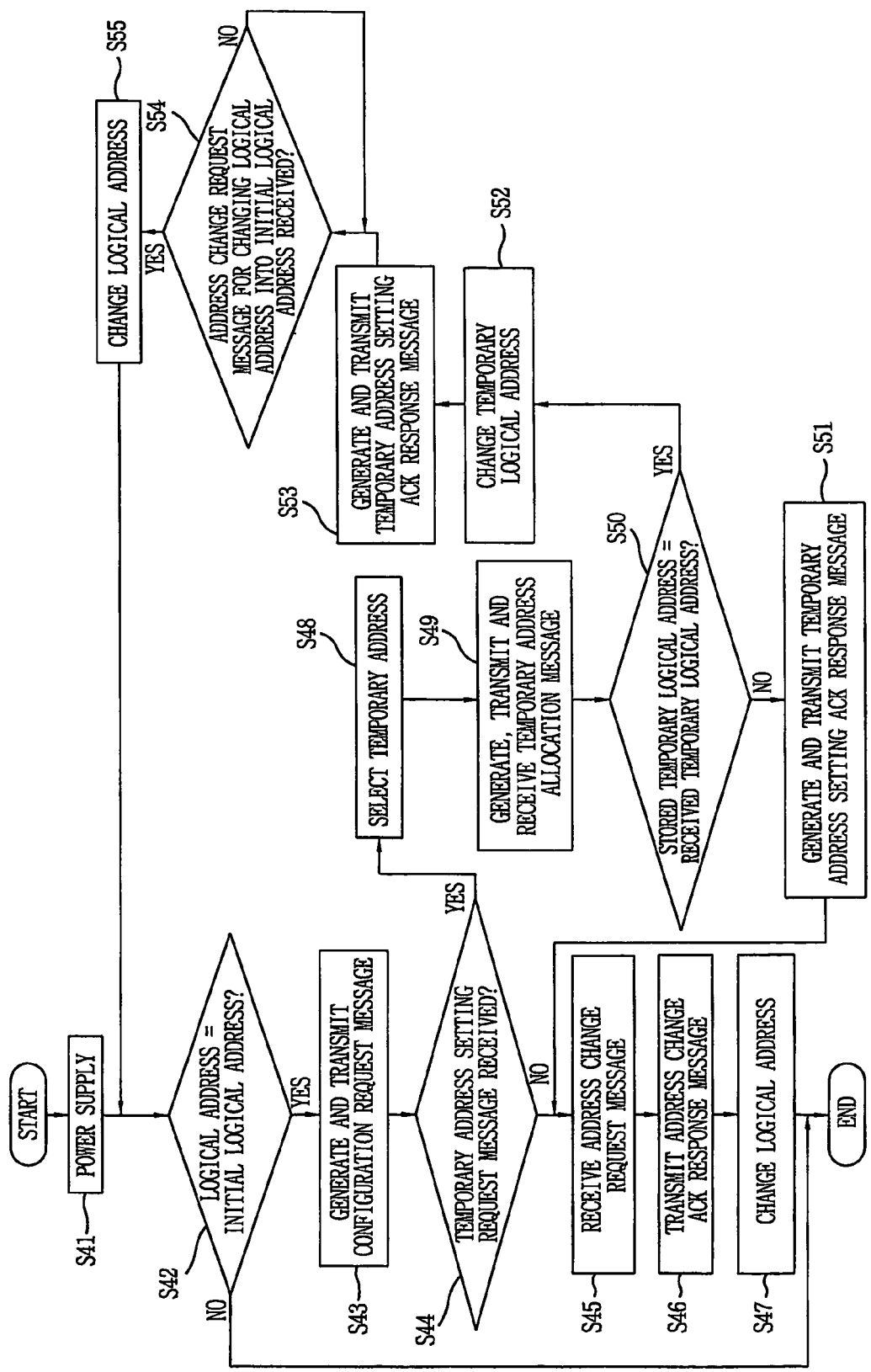

FIGS. 7A and 7B are flowcharts showing sequential steps of a process for setting a node address of a new device in the home network system in accordance with the present invention. FIG. 7A shows the operation of the master device, and FIG. 7B shows the operation of the new device (master device or slave device). For convenience' sake, a plurality of messages described below include the DA field and the SA field of FIG. 4B as well as the APDU message of FIG. 4A. In addition, each of the messages includes a predetermined command code and its related arguments.

In detail, in S41 of FIG. 7B, the new device is connected to the home network system 1 and supplied with power, and the routine goes to S42 of FIG. 7B. The new device decides whether it has received a unique node address from the home network system 1.

In S42 of FIG. 7B, the new device decides whether a logical address of its node address is an initial logical address (0x00). If the logical address is the initial is logical address, the new device is an electric device firstly connected to the home network system 1. Therefore, the new device starts a node address setting step in S43. If the logical address is not the initial logical address, the new device has already been provided with the unique node address. Accordingly, the node address setting step is ended.

In S43 of FIG. 7B, the new device generates a configuration request message ConfigurationReq for configuration in the home network system 1, and transmits the message to the whole master devices (for example, 0x00FF). As shown in FIG. 8A, in the configuration request message ConfigurationReq, a receiver field includes a node address implying the whole master devices, a sender field includes a logical address having a product code and an initial logical address of a new device, for example, an air conditioner, and a command code includes a command code corresponding to the configuration request message ConfigurationReq. Here, an argument field is not used. The new device continuously transmits the configuration request message ConfigurationReq at a predetermined time interval (for example, 5 second interval), namely an address request interval AddressReqInt. However, the new device is delayed for a random time within the range of 0 to 1000 ms after power supply, and then starts transmission.

In S11 of FIG. 7A, the master device receives the configuration request message ConfigurationReq. After receiving the first configuration request message ConfigurationReq, the master device waits for a configuration request message ConfigurationReq from the same and/or same kind new device or a different new device for 2*AddressReqInt.

In S12 of FIG. 7A, the master device decides whether it has received the plurality of configuration request messages ConfigurationReq. That is, the master device decides whether it has received the plurality of configuration request messages ConfigurationReq from the same kind products by confirming the sender fields (exactly, product codes) of the configuration request messages ConfigurationReq. If the master device has received at least some of the configuration request messages ConfigurationReq from the plurality of same kind products (namely, if the master device has received more than two configuration request messages from the same kind new devices for 2*AddressReqInt after receiving the first configuration request message), the routine goes to S17. If the master device has received one configuration request message ConfigurationReq from one product, or the plurality of configuration request messages ConfigurationReq from different kind products, the routine goes to S13.

In S13 of FIG. 7A, even if the master device receives the plurality of configuration request messages ConfigurationReq, the master device processes one configuration request message ConfigurationReq and ignores the other configuration request messages ConfigurationReq (the ignored new device continuously transmits the configuration request message at the AddressReqInt interval in S43 of FIG. 7B, and thus is processed later by the master device). When the master device receives, for example, the configuration request messages of FIG. 8A, the master device confirms node address information of the product corresponding to the sender field of the received configuration request message ConfigurationReq in the home net profile, sets a non-set logical address, namely a node address, generates an address change request message AddressChangeReq having the set logical address, and transmits the address change request message AddressChangeReq to the new device. When the master device sets the logical address, the master device sets the succeeding logical address of the largest preset logical address as the logical address of the new device, or sets a non-set logical address between the set logical addresses as the logical address of the new device, and stores the node address of the new device in the home net profile. FIG. 8B is a structure view illustrating the address change request message AddressChangeReq. As shown in FIG. 8B, 0x01 is set as the logical address of the new device. Here, one (0x0001) of the master devices firstly processes the node address setting step of the new device. Here, the set logical address is the device code and/or the cluster code.

In S44 of FIG. 7B, the new device decides whether it has received a temporary address setting request message SetTempAddressReq or the address change request message AddressChangeReq by confirming the command code of the received message. Here, if the new device has received the address change request message AddressChangeReq, the routine goes to S45, and if the new device has received the temporary address setting request message SetTempAddressReq, the routine goes to S48.

In S45 of FIG. 7B, the new device receives the address change request message AddressChangeReq transmitted in S13 of FIG. 7A. In S46, the new device generates an address change ACK response message AddressChangeAckRes, and transmits the message to the master device displayed in the sender field of the address change request message AddressChangeReq. As illustrated in FIG. 8C, the address change ACK response message AddressChangeAckRes includes a node address before change as a value of a sender field, and also includes 0x06 implying acknowledgement (ACK).

In S47 of FIG. 7B, the new device deletes the previously-stored initial logical address, and stores a logical address set by the master device, which is an argument included in the address change request message AddressChangeReq.

In S14 of FIG. 7A, the master device receives the address change ACK response message AddressChangeAckRes, and the routine goes to S12. The master device decides whether the node address setting step has been performed on the whole devices transmitting the configuration request messages ConfigurationReq. If so, the routine goes to S16, and if not, the routine goes to S12 to process the remaining new devices. Here, the routine can go back to S11.

In S16 of FIG. 7A, the master device generates an added device notification message DeviceAddReq of the home network system 1 and transmits the added device notification message DeviceAddReq to another master device. The added device notification message DeviceAddReq includes the node address (device code and/or cluster code) of the new device. Another master device updates its home net profile by adding the added device notification message DeviceAddReq. S16 can be performed simultaneously or directly after S13.

In S12 of FIG. 7A, if at least some of the configuration request messages ConfigurationReq have been transmitted from the plurality of same kind products, the routine goes to S17. If the master device has received the whole configuration request messages ConfigurationReq from the same new, devices (namely, if the master device has received more than two configuration request messages from one kind new devices for 2*AddressReqInt after receiving the first configuration request message), the routine goes to S18. If not (namely, if the master device has received more than two configuration request messages from the same new device and one or more than two configuration request messages from a different kind new device for 2*AddressReqInt after receiving the first configuration request message), the routine goes to S19.

In S18 of FIG. 7A, the master device extracts the product code (for example, 0x02) of the sender from the configuration request message ConfigurationReq, and confirms the largest logical address value (for example, 0xYY) allocated to the device having the same product code in the home net profile. The master device generates a temporary address setting request message SetTempAddressReq having a temporary logical address range (for example, 0xYY+Nd+1 to 0xFD), and transmits the temporary address setting request message SetTempAddressReq to the same new devices. Here, Nd denotes a number of the devices which can be provided with logical addresses by a predetermined procedure, and is equal to or larger than 1. The logical addresses provided to the plurality of new devices are included within the range of 0xYY+1 to 0xYY+Nd. As described above, the master device distinguishes the logical address finally provided to the device and the temporary logical address temporarily provided to the device, thereby preventing duplication of the logical address and the temporary logical address. The temporary address setting request message SetTempAddressReq of FIG. 8D includes 0x0F to 0xFD as a temporary logical address range, and '0x0E' as a command code for a temporary address setting request.

In S19 of FIG. 7A, the master device firstly processes the same kind products. That is, the master device selects one of at least one kind products or single product transmitting the plurality of configuration request messages ConfigurationReq, and performs the logical address setting step on the plurality of same kind products. Here, the master device generates the temporary address setting request message SetTempAddressReq having the temporary logical address set in the same manner as S18, transmits the temporary address setting request message SetTempAddressReq to the new devices which are the same kind products, and ignores the other configuration request messages ConfigurationReq.

Because the whole arguments included in the configuration request messages ConfigurationReq transmitted from the same kind devices are identical, the master device cannot individually identify and process the configuration request messages ConfigurationReq, and may process the configuration request messages ConfigurationReq as duplicate messages. Accordingly, the above steps S12, S17, S18 and S19 are required.

In S48 of FIG. 7B, the new device receives the temporary address setting request message SetTempAddressReq, selects one temporary logical address from the temporary logical address range, and stores the selected temporary logical address. Here, the new device is delayed for a random time within a predetermined time range (for example, 1 to 5000 ms) to prevent simultaneous execution of temporary logical address selection and S49 by the other new devices, and the routine goes to S49.

In S49 of FIG. 7B, the new device receives a temporary address allocation message AddressChangeEvent through the network, generates an temporary address allocation message AddressChangeEvent having the selected temporary logical address, and transmits the message to the same kind new devices through the network. Although the new device transmits the temporary address allocation message AddressChangeEvent once, the plurality of new devices receive and process the temporary address setting request message SetTempAddressReq, and thus the new device maintains a standby mode for a random time within a predetermined time range for reception. As shown in FIG. 8E, the temporary address allocation message AddressChangeEvent includes a node address implying the whole same kind devices as a receiver field, 0x0200 as a sender field, 0xFF81 as a command code implying the temporary address allocation message AddressChangeEvent, and 0x10 as the selected temporary logical address. The sender field can be set as 0x0210 having the temporary logical address.

In S50 of FIG. 7B, the new device compares the temporary logical address of another device included in the received temporary address allocation message AddressChangeEvent with the temporary logical address selected and stored by the new device. If the two temporary logical addresses are identical, the routine goes to S52, and if not, the routine goes to S51. In S49 and S50 of FIG. 7B, the new device compares the two temporary logical addresses directly after receiving the temporary address allocation message AddressChangeEvent. If they are identical, the routine goes to S52 (regardless of transmission of temporary address allocation message), and if not, the new device may continuously perform reception.

When the routine goes to S51 of FIG. 7B, the new device decides that the temporary logical address selected by the new device is the unique temporary logical address which is not identical to the temporary logical address selected by another device, changes the logical address into the temporary logical address, and stores the changed logical address. The new device generates a temporary address setting ACK response message SetTempAddressAckRes having the temporary logical address, and transmits the message to the master device. Referring to FIG. 8F, the temporary address setting ACK response message SetTempAddressAckRes includes a command code for a temporary address setting request, and a temporary logical address, 0x10 as an argument. Here, the new device is delayed for a random time within a predetermined time range (for example, 1 to 5000 ms) after 15 seconds from reception of the temporary address setting request message SetTempAddressReq, and then transmits the temporary address setting ACK response message SetTempAddressAckRes.

The routine goes to S20 of FIG. 7A, and the master device receives the temporary address setting ACK response message SetTempAddressAckRes.

In S21 of FIG. 7A, the master device decides whether the temporary logical address extracted from the temporary address setting A CK response message SetTempAddress AckRes is identical to a restricted logical address 0xFE. If not, the routine goes to S13. The master device sets the logical address of the new device, adds the node address having the temporary logical address to the receiver field, generates the address change request message AddressChangeReq by using the set logical address as the argument, and transmits the address change request message AddressChangeReq. In the succeeding S45, S46 and S47 of FIG. 7B, the new device changes the previously-stored temporary logical address into the received logical address, and stores the changed logical address. The master device performs S14 and S15 of FIG. 7A as described above.

In S50 of FIG. 7B, if the received temporary logical address is identical to the previously-stored temporary logical address, it implies that the plurality of devices select the same temporary logical address. When the plurality of devices transmit the temporary address setting ACK response messages SetTempAddressAckRes having the same temporary logical address, the master device regards the messages as duplicate messages and processes one of the messages. Thereafter, when the master device transmits the address change request message AddressChangeReq having the set logical address, the plurality of devices decide that the address change request message AddressChangeReq has been transmitted to themselves, and store the node address having the same logical address. As a result, the master device cannot identify the devices afterwards. In order to solve the above problem, S21, S22 and S23 of FIG. 7A and S50, S52, S53, S54 and S55 of FIG. 7B are required.

In S52 of FIG. 7B, the new device changes the duplicated temporary logical address into the restricted logical address 0xFE. The restricted logical address 0xFE is a logical address used merely in the steps for processing the duplicated temporary logical addresses. The restricted logical address 0xFE is not set as a unique logical address of any kind of new device. The new device changes the previously-stored initial logical address into the restricted logical address, and stores the changed logical address.

In S53 of FIG. 7B, the new device generates a temporary address setting ACK response messages SetTempAddressAckRes having the restricted logical address, and transmits the message to the master device. Here, the temporary address setting ACK response messages SetTempAddressAckRes includes a node address 0x02FD having the restricted logical address as a sender field, and the restricted logical address as an argument.

In S20 of FIG. 7A, the master device receives the temporary address setting ACK response messages SetTempAddressAckRes. In S21, the master device decides whether the argument included in the temporary address setting ACK response message SetTempAddressAckRes is the restricted logical address. If so, the routine goes to S22.

In S22 of FIG. 7A, the master device generates an address change request message AddressChangeReq for changing the restricted logical address into the initial logical address, and transmits the address change request message AddressChange Req. Accordingly, the devices selecting the duplicated temporary logical addresses return to the initial logical addresses, and generate and transmit the configuration request messages ConfigurationReq.

In S54 of FIG. 7B, the new device maintains a standby mode to receive the address change request message AddressChangeReq for changing the logical address into the initial logical address from the master device. In S55, the master device changes the restricted logical address into the initial logical address, and stores the changed logical address. The routine goes back to S42. The new device is operated to be provided with a unique node address by the master device.

As discussed earlier, the present invention provides the home network system using the control protocol which is the general communication standard for providing the functions of controlling and monitoring the electric devices in the home network system.

In addition, the present invention provides the home network system using the LnCP as the general communication standard.

The present invention provides the home network system which can designate and register the unique node address in the new device.

The present invention provides the home network system which can designate and register the unique node address in the plurality of same kind new devices.

Furthermore, the present invention provides the home network system which can prevent efficiency from being reduced due to duplicate logical addresses by enabling the new devices to confirm each other's logical addresses.

The present invention also provides the home network system which can make the new device as a component simply by power supply and network access.

Although the preferred embodiments of the present invention have been described, it is understood that the present invention should not be limited to these preferred embodiments but various changes and modifications can be made by one skilled in the art within the spirit and scope of the present invention as hereinafter claimed.

What is claimed is:

1. A home network system for assigning a unique address to an electric device in a local network, the system comprising:
   one or more new devices, each new device:
      including a node address having an initial logical address when accessing the home network system through a network based on a predetermined protocol,
      transmitting a configuration request message having the node address to a master device through the network, receiving a temporary address setting request message having a predetermined temporary logical address range, wherein the temporary address setting request message includes an upper address limit and a lower address limit based on a device type associated with each of the one or more new devices, wherein the lower address limit is based on a maximum value for pre-assigned logical addresses associated with those devices among the one or more new devices which are the same device type, selecting one value within the predetermined temporary logical address range and setting the selected value as a temporary logical address, generating a temporary address setting response message having the selected temporary logical address, transmitting the temporary address setting response message to the master device, receiving an address change request message having a logical address from the master device, and setting the received logical address as the unique address; and at least one master device connected to the one or more new devices through the network, wherein for each new device the master device:

receives a configuration request message from the new device, sets the temporary logical address range for the new device, transmits the temporary address setting request message having the set temporary logical address range to the new device, receives a temporary address setting response messages from the new device, sets the logical address of the new device, and transmits the address change request message having the set logical address to the new device of the selected temporary address.

2. The system of claim 1, wherein the master device updates a home net profile by registering the unique address of the new device.

3. The system of claim 2, wherein the master device transmits an added device notification message having the unique address of the new device to another master device.

4. The system of claim 1, wherein the unique address comprises at least a product code and the initial logical address of the new device.

5. The system of claim 1, wherein the new device receives a temporary address allocation notification message having a temporary logical address set by another new device from another new device after setting the received logical address as the unique address.

6. The system of claim 5, wherein the new device generates a temporary address allocation notification message having the temporary logical address and transmits the message to another new device after setting the received logical address as the unique address.

7. The system of claim 6, wherein the new device maintains a standby state for a random time within a second predetermined time after transmitting the temporary address allocation notification message.

8. The system of claim 1, wherein the address change request message comprises the temporary logical address and the set logical address.

9. The system of claim 4, wherein the temporary logical address range is individually set according to the product code.

* * * * *